United States Patent [19]
McNamee

[11] Patent Number: 4,740,090
[45] Date of Patent: Apr. 26, 1988

[54] TAMPER PROOF BAG RESEALABLE CLOSURE APPARATUS

[76] Inventor: Douglas D. McNamee, 220 E. Figueroa St., Apartment #F, Santa Barbara, Calif. 93101

[21] Appl. No.: 46,746
[22] Filed: May 7, 1987
[51] Int. Cl.⁴ .............................................. B65D 33/14
[52] U.S. Cl. ............................................ 383/5; 383/9; 206/807
[58] Field of Search ............... 383/5, 9, 22, 23, 25; 206/807

[56] References Cited

U.S. PATENT DOCUMENTS

| | | | |
|---|---|---|---|
| 1,767,770 | 6/1930 | Olsen | 383/5 |
| 2,843,309 | 7/1958 | Wheeler | 229/62 |
| 3,200,868 | 8/1965 | Strayer | 150/7 |
| 3,494,333 | 2/1970 | Mommer | 383/9 |
| 3,727,829 | 4/1973 | Huni | 229/54 |
| 4,368,765 | 1/1983 | Larkin et al. | 383/9 |
| 4,566,129 | 1/1986 | McNamee | 383/5 |

Primary Examiner—Willis Little
Attorney, Agent, or Firm—Henderson & Sturm

[57] ABSTRACT

A tamper proof dual closure arrangement (10) for use with a bag (100) having aligned apertures (103); wherein the dual closure arrangement (10) comprises a tamper proof closure unit (11) operatively connected to a two piece closure unit (12) including a male (14) and female (15) closure member; and, an extension element (13) adapted to cooperate with said male (14) and female (15) closure members to form an adjustable length re-usable closure means (70).

7 Claims, 1 Drawing Sheet

TAMPER PROOF BAG RESEALABLE CLOSURE APPARATUS

TECHNICAL FIELD

The present invention relates to the fields of tamper proof and resealable closures for flexible bags.

BACKGROUND OF THE INVENTION

The present invention comprises in part an improvement of the subject matter of my previously issued U.S. Pat. No. 4,566,129, issued on Jan. 21, 1986 and entitled RESEALABLE BAG AND TAMPER PROOF SEALING RING.

As can be seen by reference to the following U.S. Pat. Nos. 3,200,868; 3,727,829; 2,843,309; 1,767,700 and 4,566,129 the prior art is replete with myriad and diverse closure arrangements developed specifically for use with flexible bag type enclosures.

While the above mentioned prior art patents are more than adequate for their intended purpose and function, they are deficient in a number of respects; the most significant of which being their inability to function in more than one mode of operation.

Briefly stated, the prior art constructions are limited in that they must function either as a tamper proof closure or a resealable closure and a closure designed to fulfill one primary role has limited utility in a dual rolse capacity.

In reality practically no known individual closure can truly function as both a tamper proof closure element and a resealable closure element; wherein, the latter closure element has a wide range of latitude relative to the degree of closure effected by the closure device.

While some moderate success in this area has been achieved in the bottle closure field, virtually no noticeable advancements have been developed which envolve closures for flexible bags and the like. Given the recent spate of product tampering incidents that have occured over the past several years, there has been a long felt need for any substantive improvement in the flexible bag closure art dealing either with resealable and/or tamper proof closure constructions.

SUMMARY OF THE INVENTION

This invention comprises a dual closure arrangement wherein one of the closure units comprises a tamper proof closure element and the other closure unit comprises a resealable closure element. In addition the resealable closure element is further provided with an auxiliary extension element that can only be employed subsequent to the initial opening of the dual closure arrangement.

The tamper proof closure element employed in this invention is structurally identical to the subject matter of U.S. Pat. No. 4,566,129; with the noticeable distinction that the tamper proof closure element of this invention is operatively connected only to the resealable closure element of this invention as opposed to the external opposed surfaces of the flexible bag.

The resealable closure element of this invention comprises in general a two piece closure member comprising a male portion and a female portion; wherein, the male portion has a hollow core that will accept the passage of the intermediate portion of the tamper proof closure element.

In addition, the stem of the male portion of the resealable closure member is dimensioned to cooperate with an auxiliary male extension element that will releasably cooperate with the female portion of the resealable closure element at a variety of locations along the length of the male extension element.

BRIEF DESCRIPTION OF THE DRAWINGS

These and other objects, advantages and novel features of the invention will become apparent from the detailed description of the preferred embodiment of the best mode for carrying out the invention which follows; particularly when considered in conjunction with the accompanying drawings wherein.

BEST MODE FOR CARRYING OUT THE INVENTION

Figure 3:
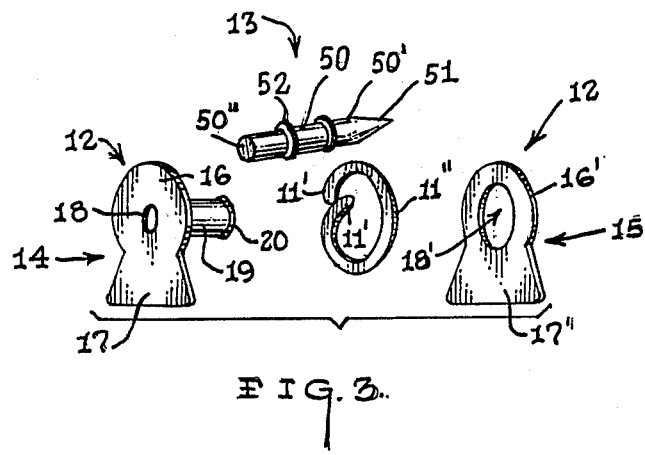
FIG. 3 is an exploded perspective view of all of the structural components of this invention.

As can be seen by reference to the drawings and in particular to FIG. 3., the tamper proof dual closure arrangement that forms the basis of the present invention is designated generally by the reference numeral (10). The dual closure arrangement (10) comprises in general a first tamper proof closure unit (11) and a second two piece closure unit (12). In addition, the two piece closure unit (12) is further provided with an auxiliary extension element (13). All of these structural components will presently be described in seriatim fashion.

Figure 1:
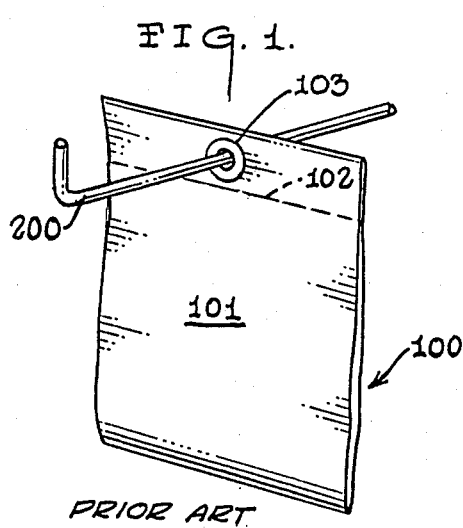
FIG. 1 is a perspective view of a prior art construction commonly employed on display racks.
Figure 2:
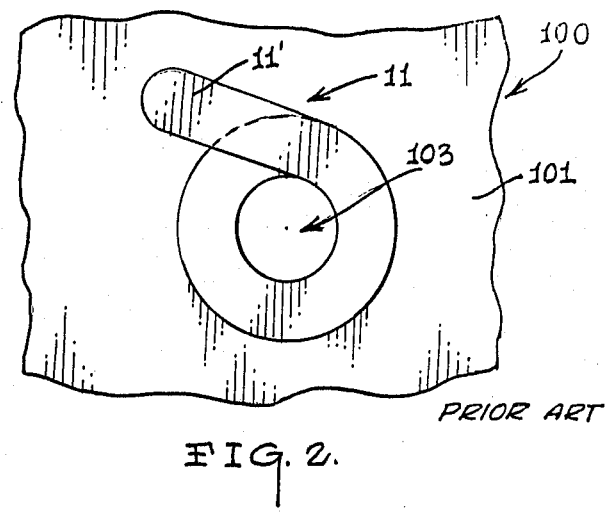
FIG. 2 is an enlarged detail veiw of my patented prior art construction.

As mentioned earlier in the specification the dual closure arrangement (10) of the present invention was developed as an improvement over the prior art constructions depicted in FIGS. 1 and 2 of the drawings. FIG. 1 shows a flexible bag member (100) wherein the walls (101) of the bag member are sealed as at (102) to form a closure. In addition, a reinforced aperture (103) is provided adjacent the top portion of the bag member (100) whereby the bag member (100) may be suspended from a display hook (200) or the like.

FIG. 2 shows the tamper proof sealing ring (11) that was the subject matter of U.S. Pat. No. 4,566,129; and as can be seen by reference to FIG. 3, the first tamper proof closure unit (11) of the present invention comprises the same basic structure employed in both the same and a slightly different relationship relative to the walls (101) and aperture (103) of the bag member (100).

As can also be seen by reference to FIG. 3, the second two piece closure unit (12) of this invention comprises a male closure member (14) and a female closure member (15); wherein the male (14) and female (15) closure members are designed to cooperate not only with one another but also with the tamper proof closure unit (11) and the bag member (100), as will be explained presently.

The male closure member (14) comprises an enlarged generally flat head element (16) having a generally circular configuration; wherein an enlarged tab portion

(17) is formed on, and projects radially outwardly from, the enlarged head element (16). In addition the head element (16) of the male closure element (14) is provided with a central aperture (18) which is in open communication with a hollow stem element (19) which is formed on the rear face of the male closure member (14); and, the outboard end of the stem element (19) is further provided with an outwardly projecting deformable lip portion (20) which will operatively engage the male closure member (14) with the female closure member (15).

The female closure member (15) comprises an enlarged generally thin flat head element (16') having a generally circular configuration; wherein an enlarged tab portion (17') is formed on, and projects radially outwardly from, the enlarged head element (16'). In addition the head element (16') of the female closure member (15) is further provided with an enlarged central aperture (18') whose diameter is slightly greater than the outside diameter of the stem element (19) and slightly less than the outside diameter of the deformable lip portion (20) of the male closure member (14).

Figure 5:
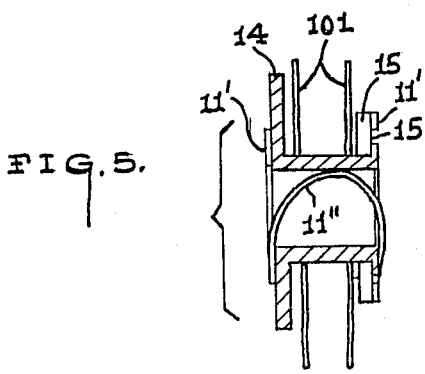
FIG. 5 is an enlarged cross-sectional view of the preferred assembly of the dual closure arrangement; and, FIG. 6 is a detail view of the operative association between the dual closure arrangement, the auxiliary extension element and a resealed bag.

As may best be appreciated by reference to FIG. 5, the male (14) and female (15) closure members are fabricated from a generally rigid yet deformable material such as hard plastic or the like; whereby, the lip portion (20) of the male stem element (19) will be resiliently deformed by the forced engagement of the lip portion (20) with the periphery of the enlarged aperture (18') in the female closure member (15); such that the male (14) and female (15) closure members cooperate in a snap-fit relationship.

Figure 4:
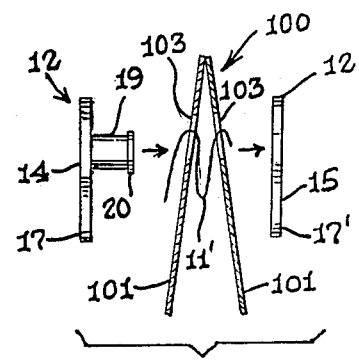
FIG. 4 is an exploded veiw of an alternate assembly of the dual closure arrangement.

As shown in FIGS. 4 and 5, in one embodiment of the dual closure arrangement (10) of this invention, the first tamper proof closure unit (11) functions as the primary closure which effects the engagement of the opposed walls (101) of the bag member (100) in the vicinity of the bag aperture (103); and in the second embodiment the two piece closure unit (12) functions as the primary closure.

In the first embodiment illustrated in FIG. 4, the tamper proof closure unit (11) is threaded through the bag apertures (103) in a spiral fashion and the free ends (11') of the tamper proof closure unit (11) are adhesively secured to the respective faces of the opposed bag walls (101) in an overlapping spiral fashion; wherein the secured ends (11') of the tamper proof closure unit (11) surround their respective bag apertures (103).

At this juncture the stem element (19) of the male closure member (14) is inserted through the bag apertures (103) such that the intermediate portion (11") of the tamper proof closure unit (11) will surround the stem element (19) within the confines of the bag member (100). The female closure member (15) is then joined to the male closure member (14); such that the two piece closure unit (12) will overlay the tamper proof closure unit (11) and the interior of the hollow stem element (19) will not contain any potential obstructions to the passage of a display hook (200).

In an alternate version of this embodiment (not shown) the free ends (11') of the tamper proof closure unit (11) are adhesively secured to the covered faces of the male (14) and female (15) closure members as opposed to the bag wall surfaces (101); wherein, there is an operative physical connection between the tamper proof closure unit (11) and the two piece closure unit. In this version tamper proof closure unit (11) would have a sufficient length to only allow marginal disengagement between the male (14) and female (15) members to visually or manually verify the structural integrity of the tamper proof closure unit (11).

In the second embodiment illustrated in FIG. 5, the two piece closure unit (12) forms the primary closure; wherein, the stem element (19) of the male closure member (14) is inserted through the bag apertures (103) and the female closure member (15) is operatively engaged thereto. At this juncture the tamper proof closure unit (11) is threaded through the hollow stem element (19) of the male closure member (14); and, the free ends (11') of the tamper proof closure unit (11) will give an immediate visual indication of whether or not the two piece closure unit (12) has been disengaged subsequent to the operative engagement of the dual closure arrangement (10).

Figure 6:
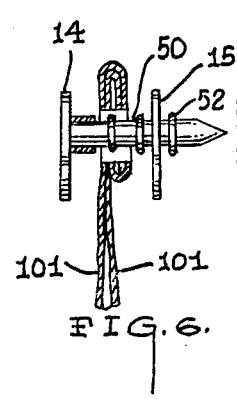

As can be seen by reference to FIGS. 3 and 6, regardless of which of the aforementioned embodiments of the dual closure arrangement is employed; once the tamper proof closure unit (11) has been ruptured to permit access to the contents of the bag member (100) the auxiliary extension element (13) is then employed in combination with the remaining functional two piece closure unit (12) to effect a variable and releasable closure for the bag member (100).

As best depicted in FIG. 3, the auxiliary extension element (13) comprises: an elongated generally cylindrical shaft member (50) having a pointed penetrating element (51) formed on one end (50'); and, a plurality of deformable raised radial ribs (52) disposed at spaced locations along the axial length of the shaft member (50); wherein the other end (50") of the shaft member (50) is dimensioned to be frictionally engaged within the hollow stem element (19) of the male closure member (14).

Once the tamper proof closure unit (11) and the two piece closure unit (12) have been disengaged from a securing relationship with respect to the pre-formed apertures (103) in the bag walls (101), there are many instances wherein the user would find it desirable to re-secure the bag (100) as the bag contents are depleted. While the dual closure unit (12) may be re-deployed for that purpose using the pre-formed bag apertures (103), there are other instances wherein the user would find it necessary or desirable to minimize as much as possible the dead air space present above the remaining contents within the bag (100).

As can best be appreciated by reference to FIG. 6, the extension element (13) can be effectively deployed in conjunction with the re-usable dual closure unit (12) to produce an adjustable length re-usable closure means (70) for a folded multiple thickness bag configuration. By inserting the cylindrical end (50") of the extension element (13) into the male closure element (14) a bag penetrating element (70') is formed; wherein, the joined extension element (13) and male closure element (14) may be forced through successive layers of bag wall material; whereby an auxiliary series of aligned bag apertures (103') are formed in the adjacent bag walls (101).

Once the pointed end (51') and one or more of the radial ribs (52) of the extension element (13) have completely passed through the folded layers of the bag (100); the female closure element (15) may releasably engage a selected one of the exposed radial ribs (52) to form the adjustable length re-usable closure means (70).

It should be appreciated at this juncture that the extension element adaptation, not only allows the dead air space above the bag contents to be minimized; but, also provides a reasonably secure releasable closure mechanism for the bag that should prevent both children and/or pets from gaining access to the bag contents.

Furthermore, in as much as the extension element (13) is only intended for use, subsequent to the initial disengagement of the dual closure arrangement (10); this invention contemplates the inclusion of the extension element with the bag contents prior to the initial operative engagement of the dual closure arrangement (10) and the bag (100).

Having thereby described the subject matter of this invention it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A tamper proof dual closure arrangement for a bag having aligned apertures extending through the walls of the bag wherein the dual closure arrangement comprises the combination of:
    a two piece closure unit comprising: a male closure member having a hollow stem element dimensioned to be received within the aligned apertures of the bag; and, a female closure member having an enlarged aperture dimensioned to releasably receive the stem element of the male closure member; and,
    a tamper proof closure unit having one end secured to the male closure member and the other end secured to the female closure member; wherein the intermediate portion of the tamper proof closure unit passes through the aligned apertures in said bag.

2. The dual closure arrangement of claim 1; wherein, the intermediate portion of the tamper proof closure unit passes through the hollow stem element of said male closure member.

3. The dual closure arrangement of claim 1; wherein, the intermediate portion of the tamper proof closure unit is disposed alongside the external periphery of said male closure member.

4. The dual closure arrangement of claim 1; wherein, said male closure member further comprises:
    an enlarged generally flat head element having a central aperture which is in open communication with the stem element; wherein, the outboard end of the stem element is provided with an outwardly projecting deformable lip portion that cooperates with the enlarged aperture in the female closure member to releasably secure the male closure member to the female closure member.

5. The dual closure arrangement of claim 4; wherein, the female closure member comprises an enlarged generally flat head element.

6. The dual closure arrangement of claim 5; wherein, both the male and female closure members are provided with an enlarged tab portion which projects radially outwardly from the respective enlarged head elements.

7. The dual closure arrangement of claim 1 further including an adjustable length re-usable closure means comprising:
    an extension element comprising an elongated generally cylindrical shaft member having a pointed penetrating element formed on one end and a plurality of deformable raised radial ribs disposed at spaced locations along the axial length of the shaft member; wherein, the other end of the shaft member is dimensioned to be frictionally received within the hollow stem element of said male closure member; and, wherein the said plurality of radial ribs are adapted to cooperate with said female closure member to produce said adjustable length reusable closure means.

* * * * *